G. W. DAVIS.
LATHE.
APPLICATION FILED JULY 15, 1907.
935,143.  Patented Sept. 28, 1909.
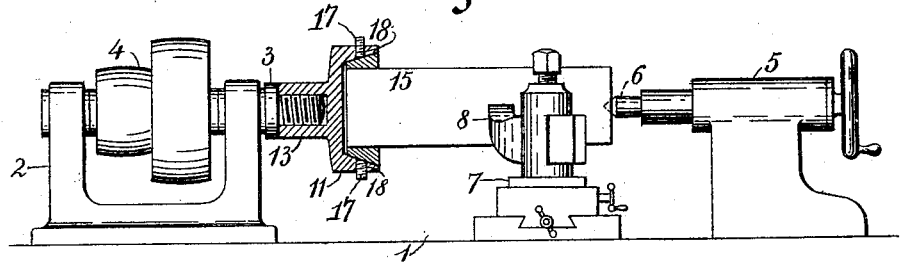
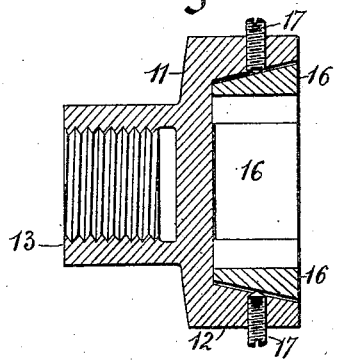
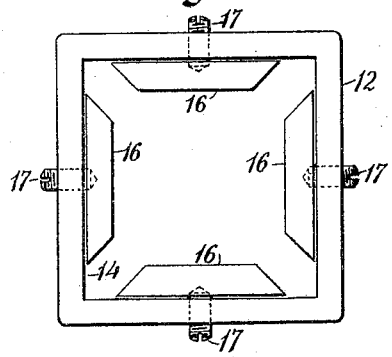
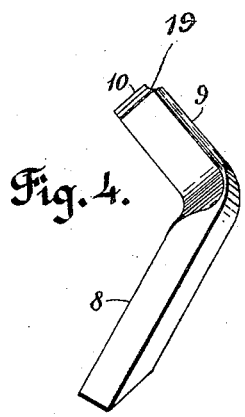
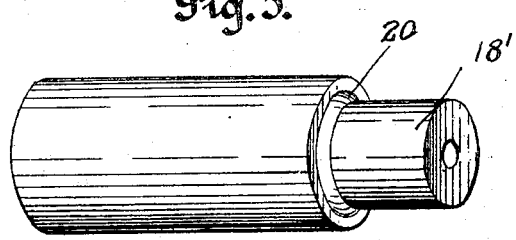
Inventor
GREER W. DAVIS.
Witnesses

UNITED STATES PATENT OFFICE.

GREER W. DAVIS, OF NEW ALBANY, INDIANA.

LATHE.

935,143.   Specification of Letters Patent.   Patented Sept. 28, 1909.

Application filed July 15, 1907. Serial No. 383,786.

*To all whom it may concern:*

Be it known that I, GREER W. DAVIS, a citizen of the United States, residing at New Albany, in the county of Floyd and State of Indiana, have invented certain new and useful Improvements in Lathes; and I do declare the following to be a full, clear, and exact description of the invention, such as will enable others skilled in the art to which it appertains to make and use the same.

My invention has relation to new and useful improvements in lathes and relates more particularly to the chuck and cutting tool and has for its object to provide means for holding and cutting brittle substances and more especially square blocks of lime used to make lime pencils for stereopticons.

With the above and other objects in view which will appear as the nature of the invention is better understood, the invention consists in certain novel features of construction, combination and arrangement of parts as will be hereinafter fully described and claimed.

In the accompanying drawings, Figure 1 is a front elevation of a lathe with a square block from which a pencil is to be made in position, one end of the mandrel and the chuck shown in section; Fig. 2 is a detail central longitudinal sectional view of the chuck; Fig. 3 is a detail end view of the chuck; Fig. 4 is a detail perspective view of the cutting tool; and Fig. 5 is a detail perspective view of the block of lime cut in the form of a stereopticon pencil.

Referring now more particularly to the drawings, the numeral 1 represents a lathe of ordinary form, 2 the head stock of the lathe, 3 the mandrel, 4 the cone or step pulley for rotating the mandrel, 5 the tail stock, 6 the center piece of the tail stock, and 7 the tool rest.

The numeral 8 represents a cutting tool which is provided with an inner and upper cutting edge 9 and 10, respectively.

The numeral 11 represents the improved chuck comprising a body portion 12 of preferably square form having extending from one face an integral interiorly threaded stem 13 adapted to screw on one end of the mandrel and provided in its opposite face with a square socket 14 adapted to receive one end of a square block of lime 15, which is held in position at its opposite end by the center 6 of said tail stock 5. Four corresponding clamping plates 16 are arranged in the socket of said chuck 1 at each side wall thereof and may be adjusted laterally to clamp the sides of square blocks of different sizes by adjusting screws 17 working through corresponding threaded perforations or apertures 18 in the side walls of said socket and swiveled at their inner ends to said clamping plates so that they may be turned independently thereof.

In the application of the invention a block of lime is arranged in position between the chuck and center piece, and when turned by the lathe is cut in proper form by the cutting tool 8. After the first cutting operation, this block is in the form of a cylinder of uniform diameter throughout its entire length. The carriage supporting the cutting tool is then caused to travel back to its former position, and the cutting tool adjusted to cut away a portion of the outer end of the lime block to form a cylindrical reduced portion or stem 18′.

The cutting tool is provided with a recess 19 at the junction of its cutting edges to form a bead 20 on the lime block at the junction of the enlarged and reduced portions thereof to strengthen the same.

While the side chuck and cutting tool are especially adapted to support and cut square blocks of lime into lime pencils for stereopticons, they may be used in all cases where such a form of chuck and cutting tool would be found desirable.

Having thus described my invention, what I claim as new is:—

A chuck provided in one face with an angular socket having a flat bottom wall and outwardly inclined or flared side walls, clamping plates arranged for radial adjustment in said socket and having their outer faces inclined inward toward their inner end, said plates having flat straight clamping faces and having their meeting edges beveled at corresponding angles to provide for greater adjustment, adjusting screws screwing through the walls of the socket and freely engaged with sockets in the inclined faces of the clamping plates, whereby the screws are permitted to turn independently of the clamping plate during the operation of adjusting the latter.

In testimony whereof I have hereunto set my hand in presence of two subscribing witnesses.

GREER W. DAVIS.

Witnesses:
D. F. BOUMAN,
H. F. HOPKINS.